United States Patent
Lipman et al.

(10) Patent No.: US 11,425,063 B2
(45) Date of Patent: Aug. 23, 2022

(54) CONTENT SELECTION

(71) Applicant: Oath Inc., New York, NY (US)

(72) Inventors: Steven Lipman, Scotts Valley, CA (US); David Robinson, Palo Alto, CA (US); Kevin Cheng, San Francisco, CA (US); Jeffrey Bonforte, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 97 days.

(21) Appl. No.: 16/377,426

(22) Filed: Apr. 8, 2019

(65) Prior Publication Data
US 2019/0238490 A1    Aug. 1, 2019

Related U.S. Application Data

(63) Continuation of application No. 14/578,268, filed on Dec. 19, 2014, now Pat. No. 10,257,133.

(51) Int. Cl.
| | |
|---|---|
| *H04L 51/046* | (2022.01) |
| *G06F 3/04842* | (2022.01) |
| *G06F 3/04847* | (2022.01) |
| *G06F 3/0488* | (2022.01) |
| *G06F 16/958* | (2019.01) |
| *H04L 51/08* | (2022.01) |

(52) U.S. Cl.
CPC .......... *H04L 51/046* (2013.01); *G06F 3/0488* (2013.01); *G06F 3/04842* (2013.01); *G06F 3/04847* (2013.01); *G06F 16/958* (2019.01); *H04L 51/08* (2013.01)

(58) Field of Classification Search
CPC ..... H04L 51/046; H04L 51/08; G06F 16/958; G06F 3/0488; G06F 3/04842; G06F 3/04847
See application file for complete search history.

(56) References Cited

U.S. PATENT DOCUMENTS

| | | | |
|---|---|---|---|
| 2012/0054166 A1* | 3/2012 | Jeremias | G06F 16/58 707/706 |
| 2012/0302167 A1* | 11/2012 | Yun | G06F 3/0416 455/41.2 |
| 2013/0091443 A1* | 4/2013 | Park | H04M 1/72552 715/758 |
| 2013/0104032 A1* | 4/2013 | Lee | G06F 16/5866 715/234 |
| 2014/0123018 A1* | 5/2014 | Park | G06F 3/0484 715/738 |
| 2014/0282242 A1* | 9/2014 | Denoue | G06F 3/0488 715/810 |

(Continued)

*Primary Examiner* — John T Repsher, III

(57) ABSTRACT

One or more systems and/or techniques for generating a content item from content within a content area are described herein. A first boundary and a second boundary may be defined for a content area based upon a first user input and a second user input, such as swipe gestures. A content item may be generated based upon content within the content area. In an example, a beginning boundary designator may be displayed for the first boundary and an ending boundary designator may be displayed for the second boundary in response to one or more swipe gestures of a user interface. In an example, the content item may be stitched to a second content item to create a stitched content item.

20 Claims, 14 Drawing Sheets

(56) References Cited

U.S. PATENT DOCUMENTS

| | | | |
|---|---|---|---|
| 2014/0289670 A1* | 9/2014 | Park | G06F 3/0485 |
| | | | 715/784 |
| 2015/0007024 A1* | 1/2015 | Jeong | G06F 40/103 |
| | | | 715/277 |
| 2015/0033193 A1* | 1/2015 | Beaurepaire | G06F 3/04845 |
| | | | 715/863 |
| 2015/0278180 A1* | 10/2015 | Nicholas, Jr. | G06F 40/169 |
| | | | 715/230 |
| 2015/0294433 A1* | 10/2015 | Ye | G06F 3/0484 |
| | | | 345/418 |
| 2015/0371362 A1* | 12/2015 | Floury | G06F 3/017 |
| | | | 345/647 |
| 2016/0098187 A1* | 4/2016 | Kim | G06F 3/04817 |
| | | | 715/768 |
| 2016/0313883 A1* | 10/2016 | Zhang | G06F 3/04883 |

\* cited by examiner

CONTENT SELECTION

CROSS REFERENCE TO RELATED APPLICATION

This application claims priority to and is a continuation of U.S. application Ser. No. 14/578,268, filed on Dec. 19, 2014, entitled "CONTENT SELECTION", which is incorporated herein.

BACKGROUND

Many computing environments may provide screen capture functionality that may be used by users to capture content that is currently displayed through a user interface. In an example, a user may perform a screen capture of an internet browser interface to create an image depicting all of the visible content displayed through the internet browser interface. In another example, the user may perform a screen capture on a mobile device to create an image depicting all of the visible content displayed on a screen of the mobile device. Unfortunately, screen capture functionality may capture whatever content is currently displayed and does not provide the user with fine grain control over what content to capture. Thus, an image created by a scene capture functionality may comprise additional content that the user may not desire, which may result in wasted storage resources and/or computational resources otherwise used to store and process the undesired content within the image. Storing, editing, and/or sharing such screen captured images may waste storage resources, processing resources, and/or bandwidth, which may be exacerbated for mobile devices.

SUMMARY

In accordance with the present disclosure, one or more systems and/or methods for generating a content item from content within a content area are provided. In an example, a first boundary (e.g., a beginning boundary) may be defined for a content area based upon a first user input (e.g., a first swipe gesture). In an example, a beginning boundary designator may be displayed for the first boundary (e.g., a first dash line displayed through a user interface corresponding to where the first swipe gesture occurred). A second boundary (e.g., an ending boundary) may be defined for the content area based upon a second user input (e.g., a second swipe gesture). In an example, an ending boundary designator may be displayed for the second boundary (e.g., a second dash line displayed through the user interface corresponding to where the second swipe gesture occurred). In an example, one or more additional boundaries may be defined for the content area (e.g., the user may draw a square or any other shape to define the first content area).

In an example, a content item may be generated based upon content within the content area (e.g., a screen shot, an image, a file depicting the content; etc.). The content may comprise chat conversation content, text message content, email content, image content, document content, mobile app interface content, and/or webpage content. In an example, the content item may comprise an image depicting a first portion, but not a second portion, of a user interface displayed through a mobile device based upon the first portion, but not the second portion being within the first content area (e.g., the content item may comprise an image file depicting a screen shot of merely a top portion of a vacation photo displayed through a social network interface).

In an example, user input may be used to define a second content area (e.g., a bottom portion of the vacation photo). A second content item may be generated based upon second content within the second content area. The content item (e.g., depicting the top portion of the vacation photo) may be stitched to the second content item (e.g., depicting the bottom portion of the vacation photo) to create a stitched content item. The stitching may comprise blending a first portion of the content item with a second portion of the second content item. In an example, the content area may comprise content from a first content source and the second content area may comprise second content from the first content source (e.g., portions of the vacation photo). In another example, the content area may comprise content from the first content source (e.g., the top portion of the vacation photo) and the second content area may comprise second content from a second content source (e.g., a sentence within a vacation email that is stitched together with the top portion of the vacation photo to create the stitched content item).

In an example, the user interface may display a display content item user interface element, a save content item user interface element, a share content item user interface element, and/or a publish content item user interface element. The display content item user interface element may be used to display the content item on a display. The save content item user interface element may be used to save the content item as a file. The share content item user interface element may be used to share the content item with one or more users (e.g., via text message, instant message, email, etc.). The publish content item user interface element may be used to publish the first content item to a website, a social network, a microblog service, and/or a calendar.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
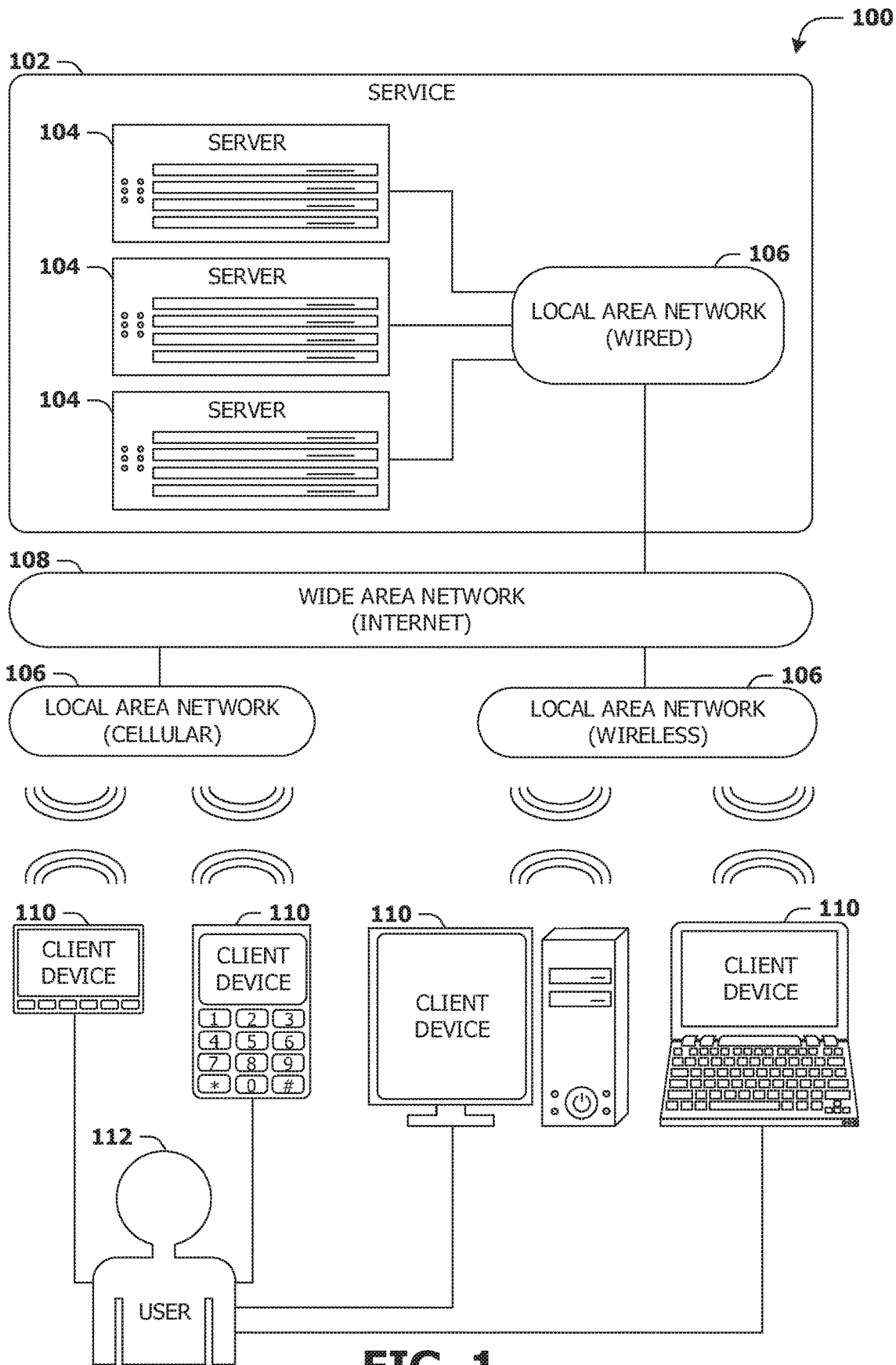
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols, and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a Wi-Fi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
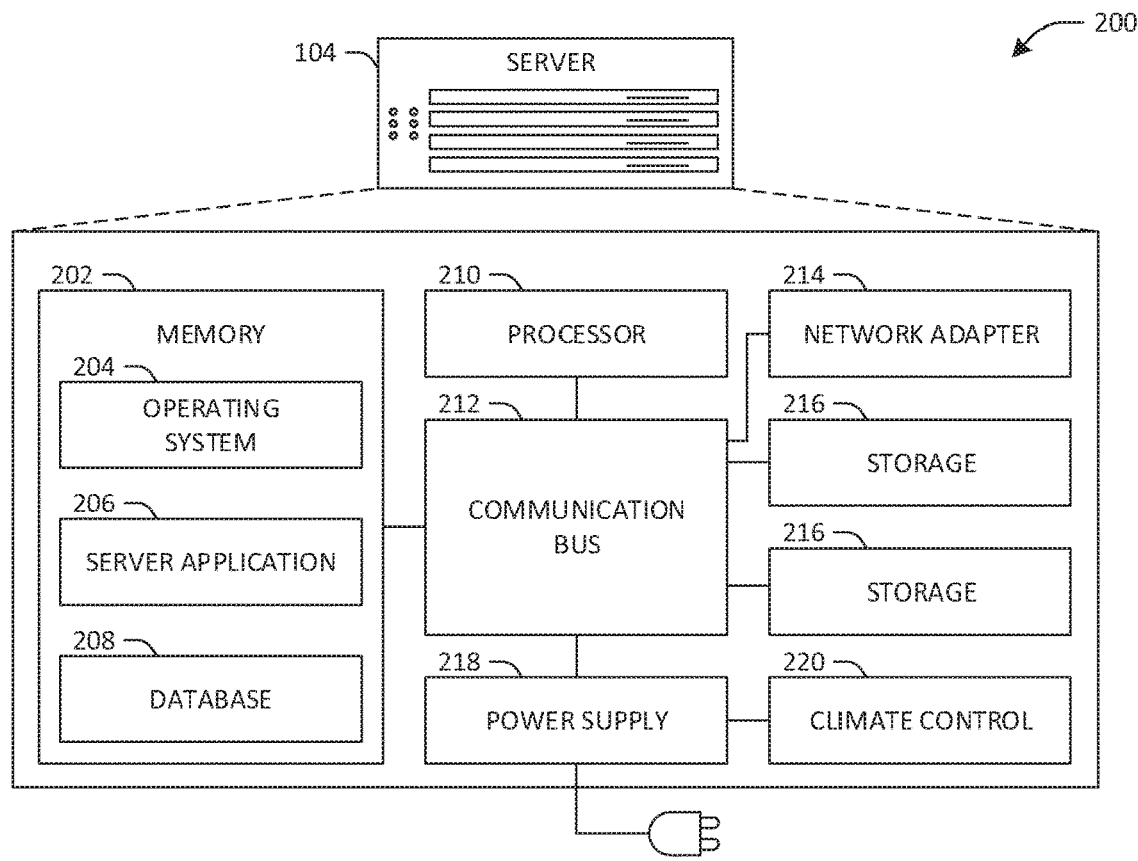
FIG. 2 is an illustration of a scenario involving an exemplary configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
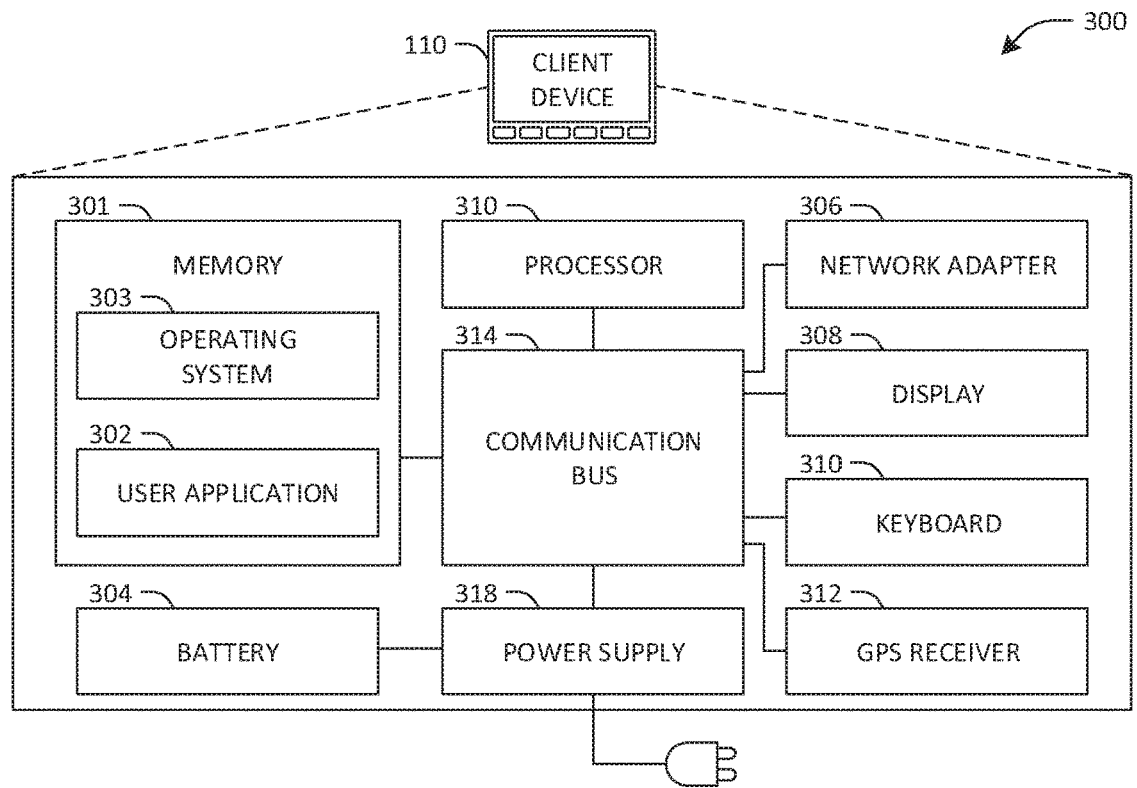
FIG. 3 is an illustration of a scenario involving an exemplary configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 314 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more techniques and/or systems for generating a content item from content within a content area are provided herein. In an example, a user viewing a content source (e.g., a text message, an email, an instant message, a document, a picture, a webpage, etc.) may desire to view, share, publish, and/or save a first portion of the content source, but not a second portion of the content source (e.g., a first user may wish to send a first portion of a text message regarding plans for Saturday night to a second user, but not send a second portion of the text message regarding a personal information of the text message). As provided herein, a first boundary and/or a second boundary may be defined for a content area of a content source based upon a first user input and/or a second user input (e.g., swipe gestures performed on a touch screen display of a mobile device may be used to define boundaries of the content area). A first content item may be generated based upon content within the content area (e.g., a snapshot image of the Saturday night plans portion, but not the personal information portion, of the text message). In an example, the first content item may be stitched to a second content item (e.g., a restaurant image from a website) to form a stitched content item. The stitched content item may comprise content from the first content source (e.g., a text message) and content from a second content source (e.g., the webpage).

As provided herein, a user may efficiently generate a content item for a specific portion (e.g., a content area defined by a user) or portions of content from one or more content sources. Generating the content item for a desired portion or portions of content may improve the ability of the user to view the desired portion or portions of content (e.g., removed unwanted content and/or combine desired portions of content from more than one content source, etc.) and/or reduce storage resources, processing resources, and/or bandwidth otherwise used to create, edit, store, and/or share content items that may comprise additional content with which the user is not interested. For example, a web browser interface may display a social network webpage comprising a social network profile with 7 social network posts. Accordingly, the user may define content areas that include 2 of the social network posts, but not 5 of the social network posts, for generating a content item depicting merely the 2 social network posts, which may improve the efficiency of viewing the desired portions (e.g., the 2 social network posts) and/or reduce the amount of data stored within the content item for improve storage efficiency, processing resources for editing, and/or bandwidth for sharing.

Figure 4:
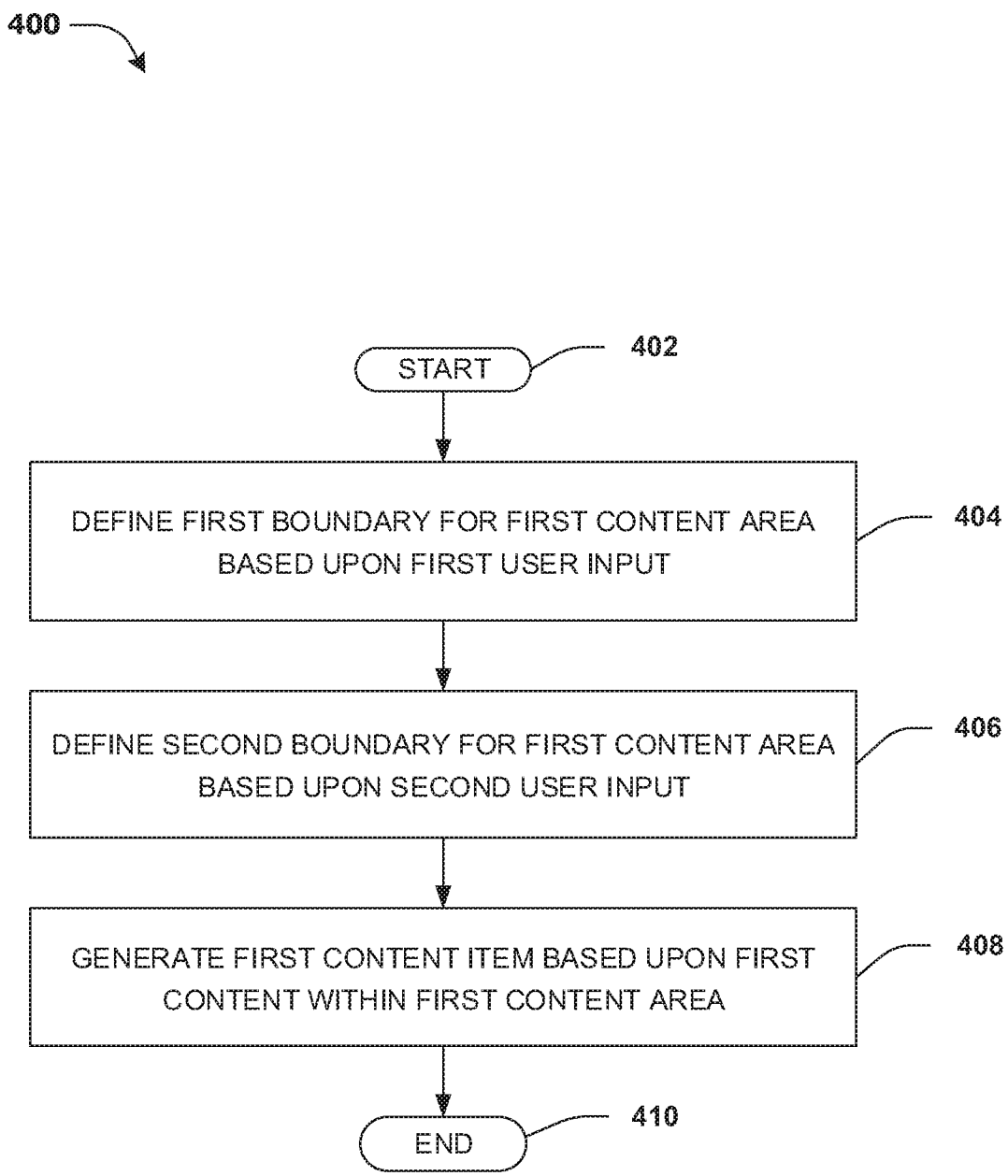
FIG. 4 is a flow chart illustrating an example method for generating a content item from content within a content area.

An embodiment for generating a content item from content within a content area is illustrated by an exemplary method 400 of FIG. 4. At 402, the method starts. At 404, a first boundary may be defined for a first content area based upon a first user input. At 406, a second boundary may be defined for the first content area based upon a second user input. In an example, a user may provide the first user input by performing a first gesture, such as a first swipe gesture, and provide the second user input by performing a second gesture, such as a second swipe gesture, on a display of a mobile device (e.g., a smartphone, a tablet, a smartwatch, a personal digital assistant, etc.). The display of the mobile device may comprise a touchscreen display (e.g., a resistive display, a capacitive display, an infrared display, an optical imaging display, etc.). In an example, the first user input and/or the second user input may comprise a first swipe gesture and/or a second swipe gesture on the touchscreen display of the mobile device (e.g., the user may swipe a finger from a first side of the display to a second side of the display to define the first boundary and/or the second boundary). A swipe gesture may comprise a horizontal swipe gesture, a vertical swipe gesture, a diagonal a circular swipe gesture, a freeform swipe gesture (e.g., the user may draw around a portion of a first social network post, half of an image, a user interface element, and a second social network post), a selection gesture (e.g., a gesture used to select an image). In an example, a first horizontal swipe may be used to demarcate a beginning boundary for the first content area and a second horizontal swipe may be used to demarcate an ending boundary for the first content area. In an example, the first content area may be greater than or less than a viewable display area of the display of the mobile device (e.g., the user may scroll up or down on the touchscreen display to view all of the content within the first content area).

A third boundary and/or a fourth boundary may be defined for the first content area based upon a third user input and/or a fourth user input. In an example, a third gesture and/or a fourth gesture may be performed on the touchscreen display of the mobile device to define the third boundary and/or the fourth boundary of the first content area (e.g., the user may manually draw a first content area side boundary and/or a second content area side boundary for the first content area). In another example, the third boundary and/or the fourth boundary (e.g., the first content area side boundary and/or the second content area side boundary) may be defined for the first content area without user input (e.g., automatically). For example, the third boundary and/or the fourth boundary may be defined based upon a location of the first boundary and the second boundary relative to the first side of the touchscreen display and/or the second side of the touchscreen display (e.g., the boundaries may be used to bound the first content area within a single contained area).

In an example, the user inputs may be provided consecutively and/or contemporaneously (e.g., the user may define one or more boundaries of a square shaped content area, a rectangle shaped content area, a circular shaped content area, etc. while remaining in continuous contact with the touchscreen display). In an example, the first boundary may be defined in response to a first directional change gesture and/or a second directional change gesture (e.g., drawing a corner, a bend, a curve, etc. of a content area). For example, the first directional change gesture and/or the second directional change gesture may be configured to define a start point and/or and endpoint for a first boundary (e.g., the first boundary may be defined as a first line extending between a first corner directional change gesture and a second corner directional change gesture) when the first user input and the second user input are provided consecutively.

In an example, the first content area may correspond to a user interface displayed on the mobile device. The user interface may be configured to display a beginning boundary designator and/or an ending boundary designator for the first boundary and/or the second boundary of the first content area to the user. The beginning boundary designator and/or the ending boundary designator may comprise at least one of a line (e.g., straight line, squiggly line, zigzag line, bold line, etc.) or a dashed line overlaid on the user interface. The beginning boundary designator and/or the ending boundary designator may be configured to provide the user with a visual representation of the boundaries defining the first content area. For example, a red line beginning boundary designator may be displayed on the user interface in response to a first horizontal swipe gesture used to demarcate the beginning boundary of the first content area.

At 408, a first content item may be generated based upon first content within the first content area. The first content may comprise at least one of text message content, chat conversation content, email content, image content, document content, mobile app interface content, and/or webpage content from a first content source. In an example, the first content may comprise embedded content, such as source code data (e.g., source code data for embedded pictures, microblog entries, videos, etc.), location data (e.g., global positioning data), hyperlink data (e.g., URL data linking to a website), etc. from the first content within the first content area. The first content source may comprise a text message (e.g., a short message service (SMS) message, a multimedia messaging service (MMS) message, etc.), a chat conversation (e.g., an instant message, a social network message, etc.), an email, an image (e.g., a joint photographic experts group (JPEG), a graphics interchange format (GIF), a raw image format (RAW), a tagged image file format (TIFF), a computer graphics metafile, etc.), a document (e.g., a portable document format (PDF), a spread sheet, a word processing document, etc.), a mobile app interface (e.g., a weather app, a stock app, a sports score app, banking app, a videogame app, etc.), and/or webpage.

The generating of the first content item may comprise generating a first image (e.g., a snapshot file). The first image may be generated as a screen capture of the first content within the user interface. In an example, the first image may be configured to include embedded content (e.g., active hyperlinks, video source code, etc.). In an example, generating the first image may comprise extracting a first set of display data (e.g., pixel data, source code data, location data, hyperlink data, etc.) for the first content within the first content area. The first set of display data may comprise pixel size data, pixel location data (e.g., coordinates for pixels relative to the display and/or to other pixels), pixel type data (e.g., undefined pixel formats, indexed pixel format, etc.), pixel color data (e.g., RGB color value, grey scale color value, monochrome color value, etc.), bits per pixel data, etc. In an example, the first set of display data may be extracted from a frame buffer (e.g., a buffer containing image data for an image currently being displayed and/or for an image recently displayed, such as on the user interface, etc.). The first set of display data may be stored in a first content area buffer. The first set of display data stored in the first content area buffer may be processed to obtain the first image. In an example, the first set of display data may be processed based upon a user preference, such as image format (e.g., JPEG, TIFF, etc.), file size, image orientation (e.g., landscape, portrait, etc.), an embedded content preference (e.g., whether or not to include active hyperlinks, source code data, etc.).

The generating of the first content item may comprise scaling the first image. The first image may be scaled (e.g., subsampled, upsampled, etc.) based upon a first display property (e.g., length, width, and/or height of the viewable display area, resolution of the display, etc.) of the display. For example, when the first content area is smaller than the viewable display area, the first image may be upsampled so that the first image may fit within the viewable display area. The upsampling may comprise the interpolation of additional pixels into the first image to improve the quality of the first image. In another example, when the first content area is larger than viewable display area, the first image may be subsampled so that the first image may fit within the viewable display area (e.g., a group of pixels and/or pixel values may be replaced by a smaller number of pixels and/or pixel values).

In an example, one or more additional boundaries for a second content area may be defined based upon one or more user inputs (e.g., a swipe gesture, etc.). A second content item may be generated based upon second content (e.g., instant message content) within the second content area. In an example, the first content and the second content may be from a first content source (e.g., the first content may be from a first part of an instant message conversation and the second content may be from a second part of the same instant message conversation). In another example, the first content may be from a first content source and the second content may be from a second content source (e.g., the first content may be from a text message conversation and the second content may be from a shopping application).

In an example, the first content item may be stitched to the second content item to create a first stitched content item. The stitching may comprise aligning at least one boundary of the first content item with at least one boundary of the second content item. For example, a first content area side boundary of the first content item may be aligned with a second content area side boundary of the second content item (e.g., the content items may be aligned in a side-by-side orientation). In another example, a first content item lower boundary of the first content item may be aligned with the second content item upper boundary of the second content item (e.g., the content items may be aligned in a stacked orientation).

In an example, the stitching may comprise blending a first portion of the first content item with a second portion of the second content item to create the first stitched content item. The blending may comprise modifying the display data (e.g., pixel data) for the first portion and/or the second portion to reduce a transition between the first content item and the second content item (e.g., make the first stitched content item appear as a homogenous image when displayed). In an example, a first portion of the first content item proximate the first content item lower boundary may be blended with the a second portion of the second content item proximate the second content item upper boundary to create the first stitched content item. In an example, the first stitched content item may be scaled based upon a display property of the mobile device.

In an example, the user interface may be configured to display at least one of a censor content item user interface element, a save content item user interface element, a share content item user interface element, or a publish content item user interface element on the display of the mobile device. In an example, at least one of the elements is displayed in response to the generation of a content item.

In an example, the censor content item user interface element may be displayed. The censor content item user interface element may be used to censor a portion of content within the first content item (e.g., censor personal information from a bank statement content item, censor a phone number from a text message content item, etc.). In an example, the censor content item user interface element may cause the portion of content to be indiscernible (e.g., blacked out, blurred, pixelated, etc.).

In an example, the save content item user interface element may be displayed. The save content item user interface element may be used to save the first content item, the second content item, and/or the first stitched content item as a file (e.g., JPEG, TIFF, GIFF, PDF, etc.). For example, the first content item may be saved to a storage component (e.g., a hard drive, a local network, a cloud storage drive, a clipboard, a camera roll, etc.). The first content item may be saved in response to the user selecting the save content item user interface element from the user interface.

In an example, the share content item user interface element may be displayed. The share content item user interface element may be used to share the first content item with one or more users. The first content item may be shared in response to the user selecting the share content item user interface element from the user interface. The first content item may be shared through at least one of a text message, an email, a social network post, or an instant message.

In an example, the publish content item user interface element may be displayed. The publish content item user interface element may be used to publish the first content item to at least one of a website, a social network, a microblog service, or a calendar. The first content item may be published in response to the user selecting the publish content item user interface element from the user interface.

At 410, the method ends.

Figure 5:
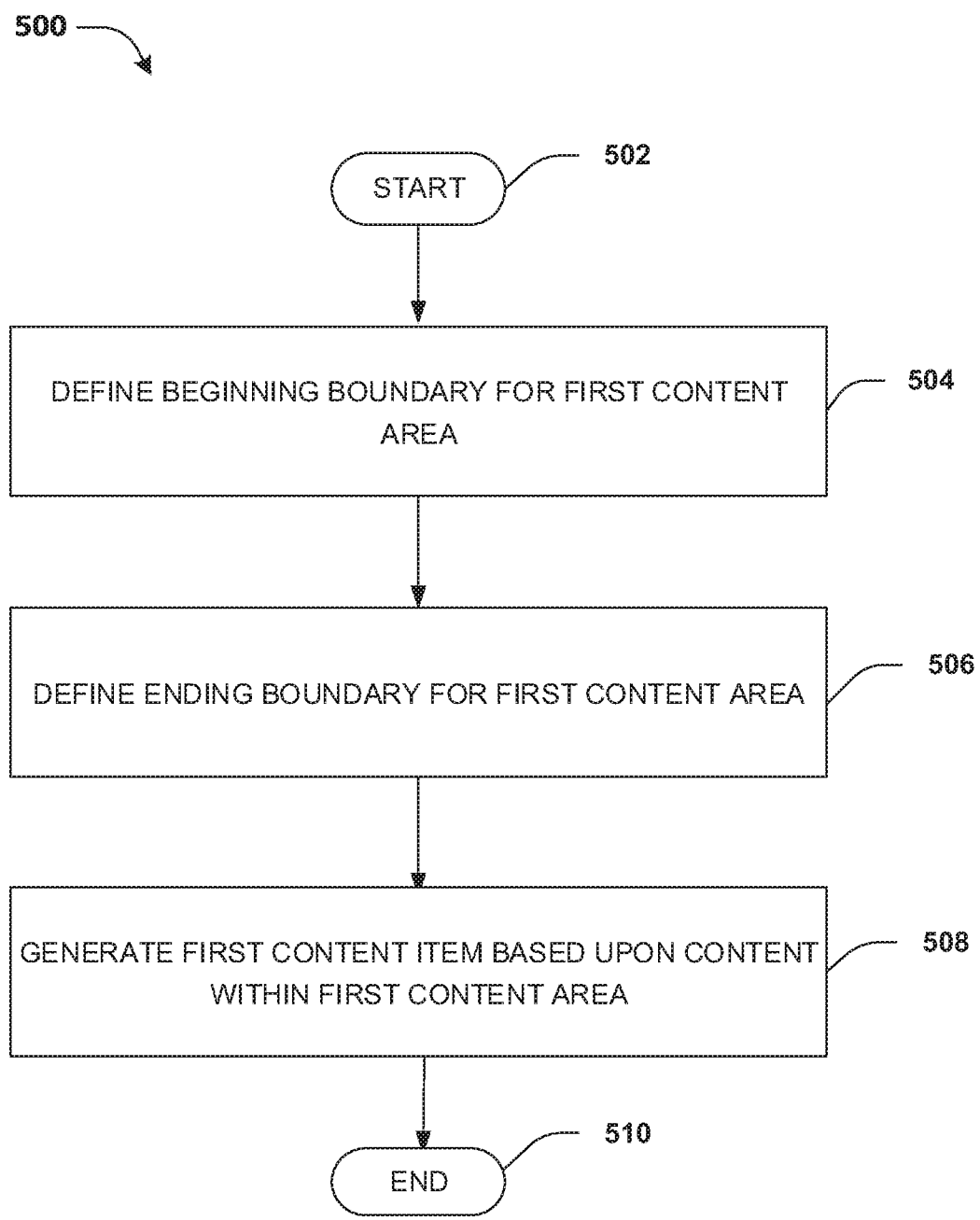
FIG. 5 is a flow chart illustrating an example method for generating a content item from content within a content area, wherein an image is a combination of one or more images.

An embodiment for generating a content item from content within a content area is illustrated by an exemplary method 500 of FIG. 5. At 502, the method starts. At 504, a beginning boundary may be defined for a first content area. The beginning boundary may be defined based upon a first swipe gesture of a user interface. The user interface may comprise a first content and/or a second content (e.g., a first portion of an email conversation and a second portion of an email conversation). At 506, an ending boundary may be defined for the first content area. The ending boundary may be defined based upon a second swipe gesture of the user interface. In an example, a horizontal beginning boundary designator and/or a horizontal ending boundary designator may be displayed for the beginning boundary and/or the ending boundary based upon the swipe gestures (e.g., horizontal swipe gestures across an email user interface). At 508, a first content item may be generated based upon the first content area. The first content item may comprise first content (e.g., the first portion of the email conversation) but not second content (e.g., the second portion of the email conversation) based upon the first content, but not the second content, being within the first content area.

In an example, the user interface may be configured to display a display content item user interface element, a save content item user interface element, a share content item user interface element, a publish content item user interface element, and/or a censor content item user interface element. In an example, the user interface elements may be used to save the first content item as a file, share the first content item with one or more users, publish the first content item, display the first content item on the display of the mobile device, and/or censor content within the first content item.

At 510, the method ends.

Figure 6A:
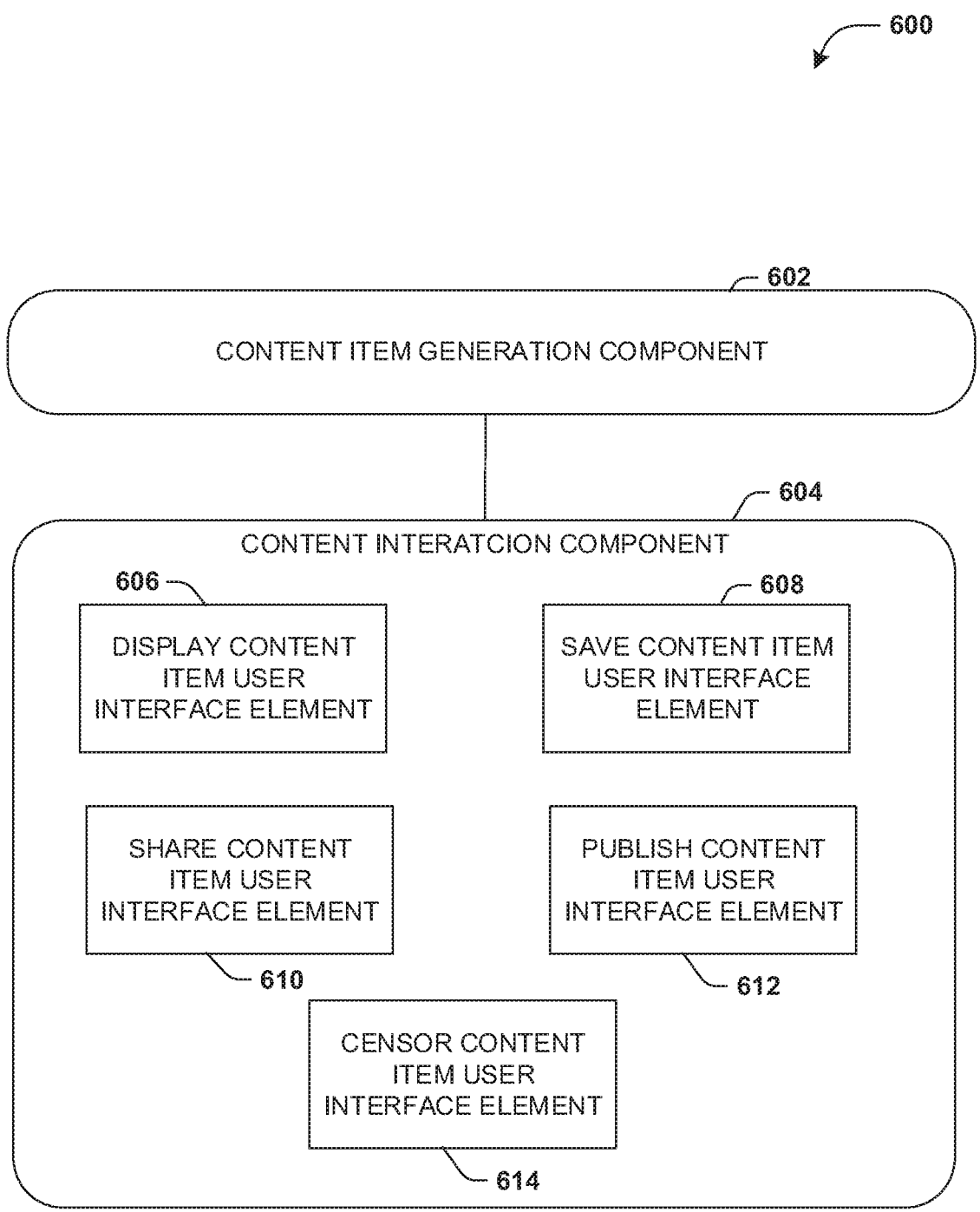
FIG. 6A is a component block diagram illustrating an exemplary system for generating a content item from content within a content area.

FIG. 6A illustrates an example of a system 600 for generating a content item from content within a content area. The system 600 may comprise a content item generation component 602 and/or a content interaction component 604. In an example, the content item generation component 602 may be configured to define a first boundary and/or a second boundary for a first content area based upon a first user input and/or a second user input (e.g., a swipe gesture). The content generation component 602 may be configured to generate a first content item based upon first content within the first content area. In an example, the content item generation component 602 may be configured to stitch the first content item to a second content item (e.g., defined by boundaries corresponding to user input, such as a user drawing a freeform shape around a portion of a webpage) to generate a first stitched content item.

The content interaction component 604 may be configured display a display content item user interface element 606, a save content item user interface element 608, a share content item user interface element 610, a publish content item user interface element 612 and/or a censor content item user interface element 614. In an example, responsive to the selection of at least one of the content item user interface elements 606-614, the content interaction component 604 may display, save, share, censor, and/or publish the first content item and/or the first stitched content item.

Figure 6B:
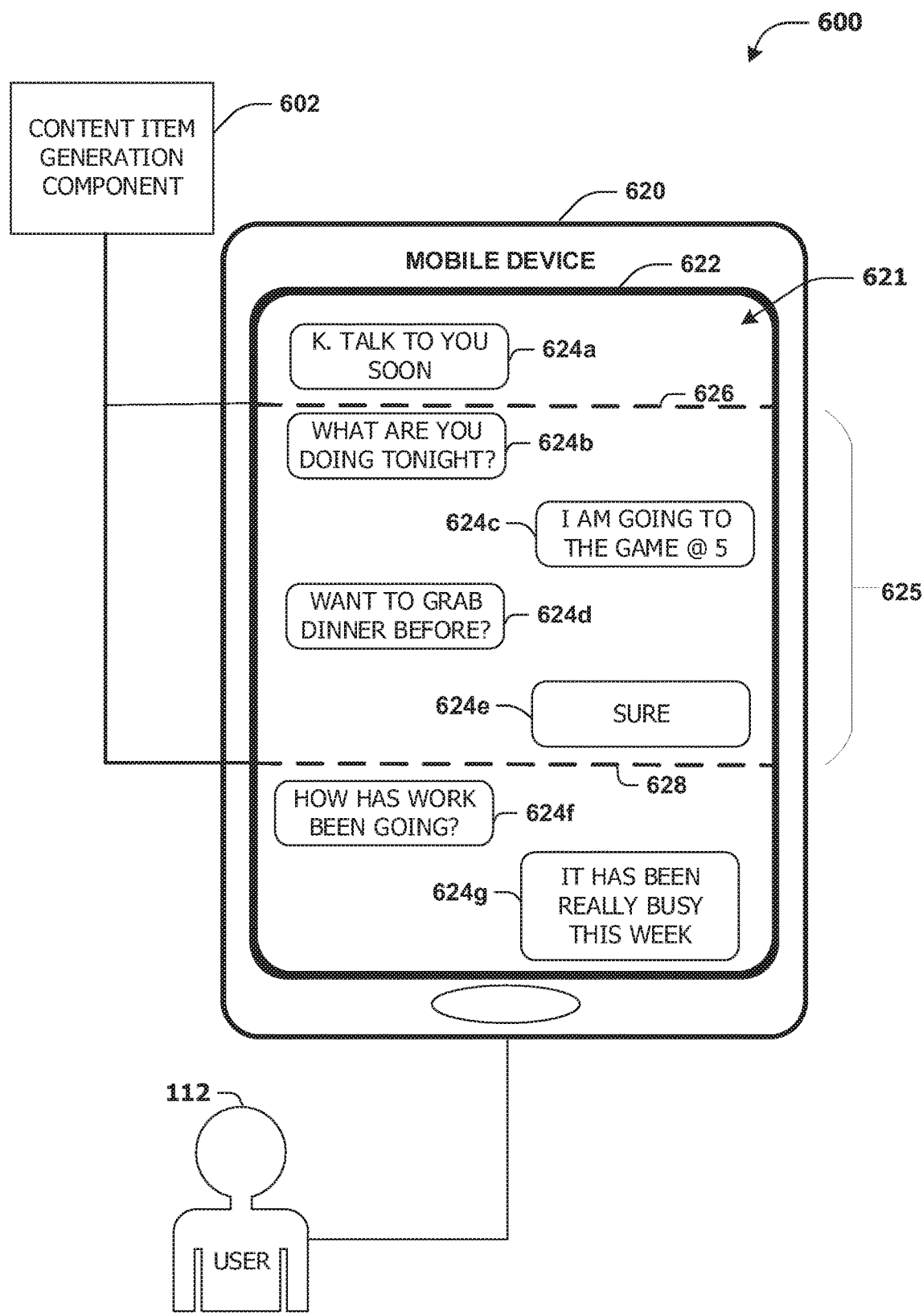
FIG. 6B is a component block diagram illustrating an exemplary system for generating a content item from content within a content area, where a first boundary and a second boundary are defined.

FIGS. 6B-6H illustrate examples of the system 600 generating content items associated with a mobile device 620. A first content source, such as a text message content source 621, may be displayed on a display 622 of the mobile device 620 (e.g., a smartphone, a tablet, etc.), as illustrated in FIG. 6B. The text message content source 621 may comprise text message content 624a-624g. The content item generation component 602 may be configured to define a first boundary 626 and/or a second boundary 628 in response to a first gesture and/or a second gesture performed by a user 112 on the display 622 (e.g., a touchscreen display). In an example, the user 112 may defined boundaries for a first portion 625 of text message content (e.g., text message content 624b-624e) by performing the first gesture (e.g., a swipe gesture, etc.) above the first portion 625 (e.g., defining the first boundary 626) and performing the second gesture below the first portion 625 (e.g., defining the second boundary 628).

Figure 6C:
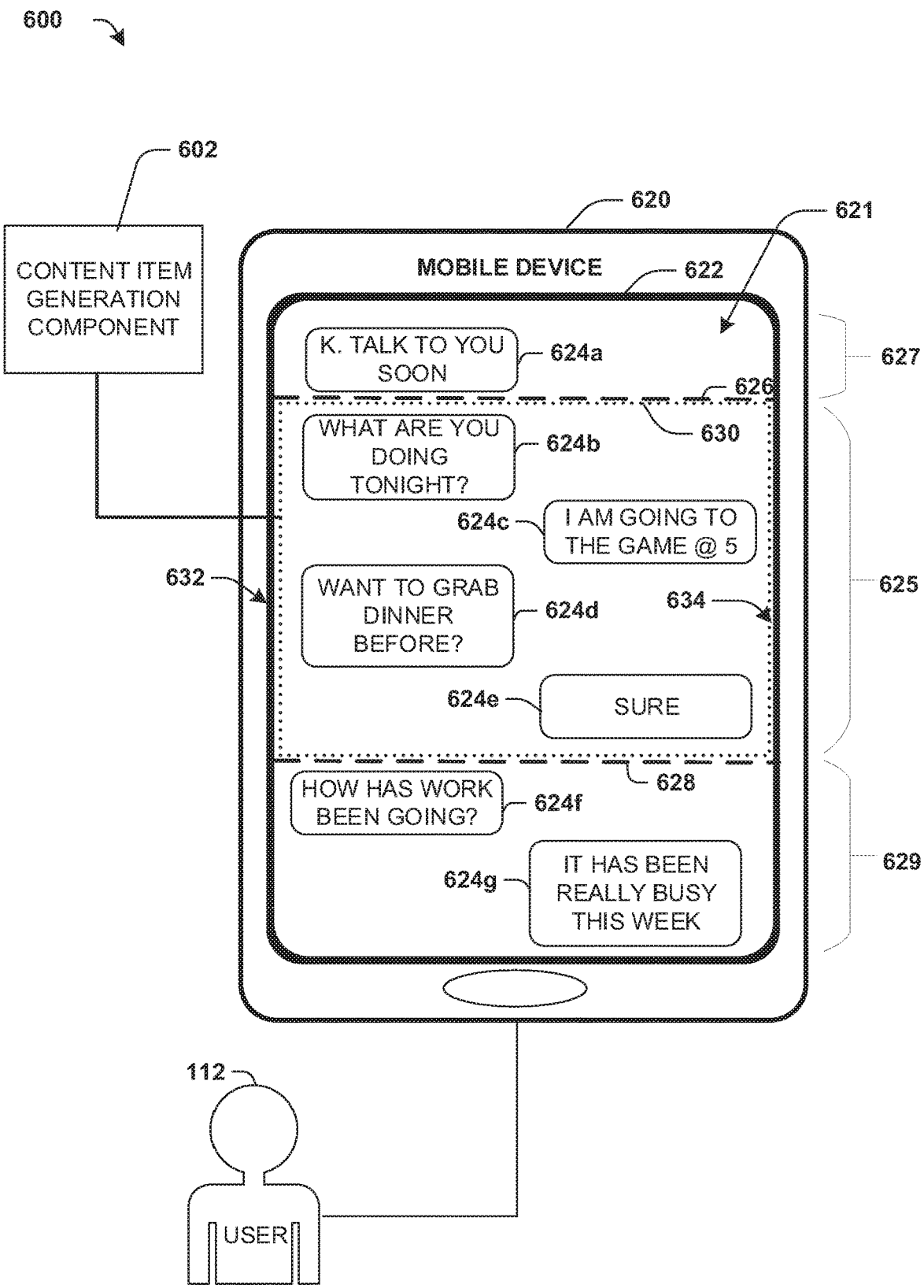
FIG. 6C is a component block diagram illustrating an exemplary system for generating a content item from content within a content area, where a first content area is defined based upon a first boundary and a second boundary.

Referring to FIG. 6C, the content item generation component 602 may delineate a first content area 630 (represented by the dotted outline) based upon the first boundary 626 and the second boundary 628. In an example, a first side 632 and a second side 634 of the display 622 may be configured as side boundaries (e.g., first content item side boundary) for delineating the first content area 630. The first content area 630 may comprise the first portion 625 of text message content (e.g., text message content 624b-624e), but not a second portion 627 of text message content (e.g., 624a) and/or a third portion 629 of text message content (e.g., text message content 624f-624g).

Figure 6D:
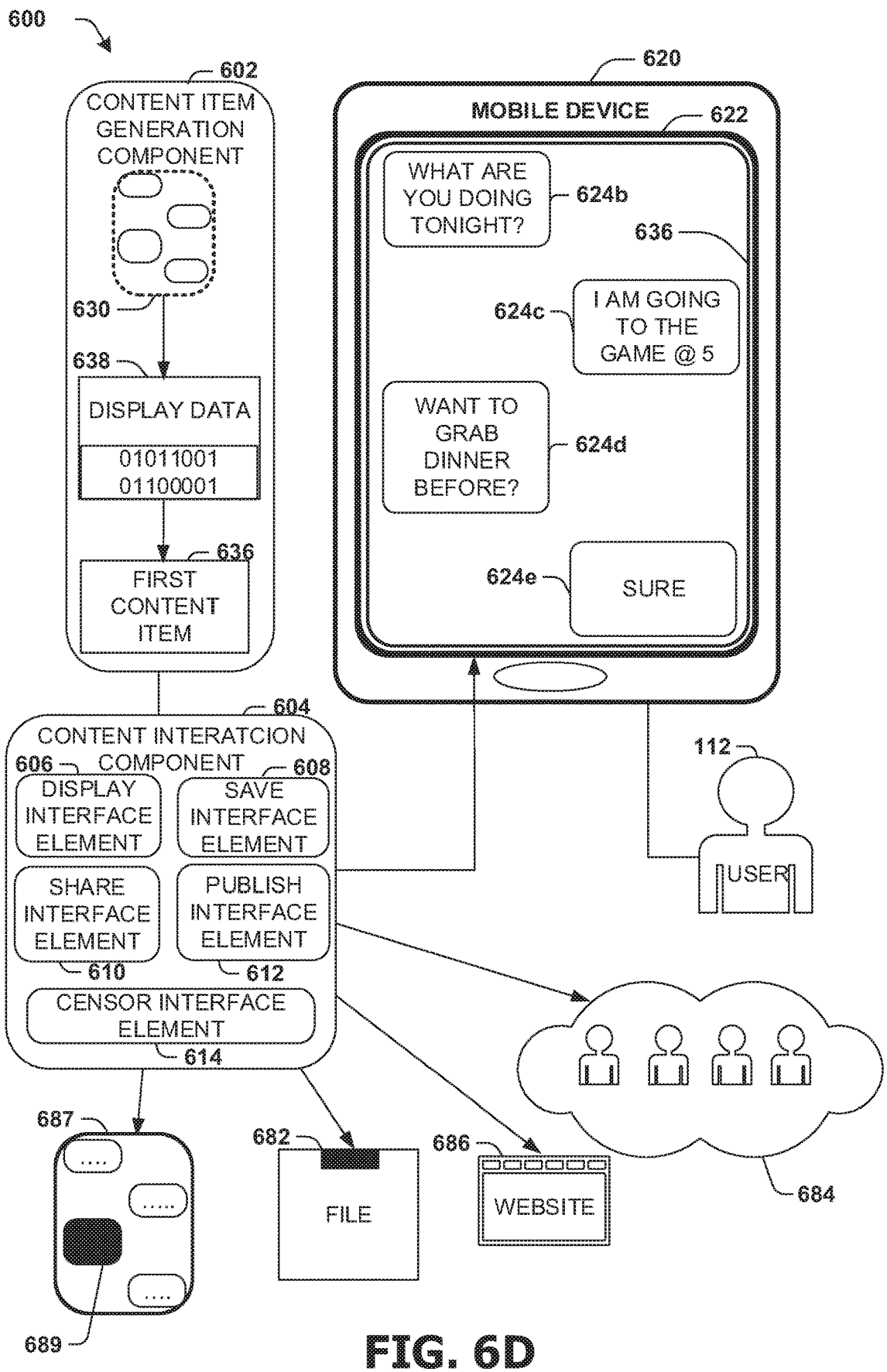
FIG. 6D is a component block diagram illustrating an exemplary system for generating a content item from content within a content area, where a first content item is generated from a first content source.

Referring to FIG. 6D, the content item generation component 602 may be configured to generate a first content item 636 based upon the text message content 624b-624e (e.g., the first portion 625) within the first content area 630.

The first content area 630 may comprise a first set of display data 638 for the text message content 624*b*-624*e*. The content item generation component 602 may be configured to extract the first set of display data 638 for the first content area 630. In an example, the content item generation component 602 may generate the first content item 636 based upon the first set of display data 638 (e.g., generate a snapshot image of the text message content 624*b*-624*e*).

The content interaction component 604 may be configured to display the display content item user interface element 606, the save content item user interface element 608, the share content item user interface element 610, the publish content item user interface element 612 and/or the censor content item user interface element 614 in response to the first content item 636 being generated. In an example, the display content item user interface element 606 may be used to display the first content item 636 on the display 622. In an example, the save content item user interface element 608 may be used to save the first content item 636 as a file 682. In an example, the share content item user interface element 610 may be used to share the first content item 636 with one or more users 684 (e.g., via text message, instant message, email, etc.). In an example, the publish content item user interface element 612 may be used to publish the first content item 636 to a website 686. In an example, the censor content item user interface element 614 may be used to censor 689 the first content item 636 (e.g., blackout, blur, etc. a part of the first content item) to create a censored content item 687.

Figure 6E:
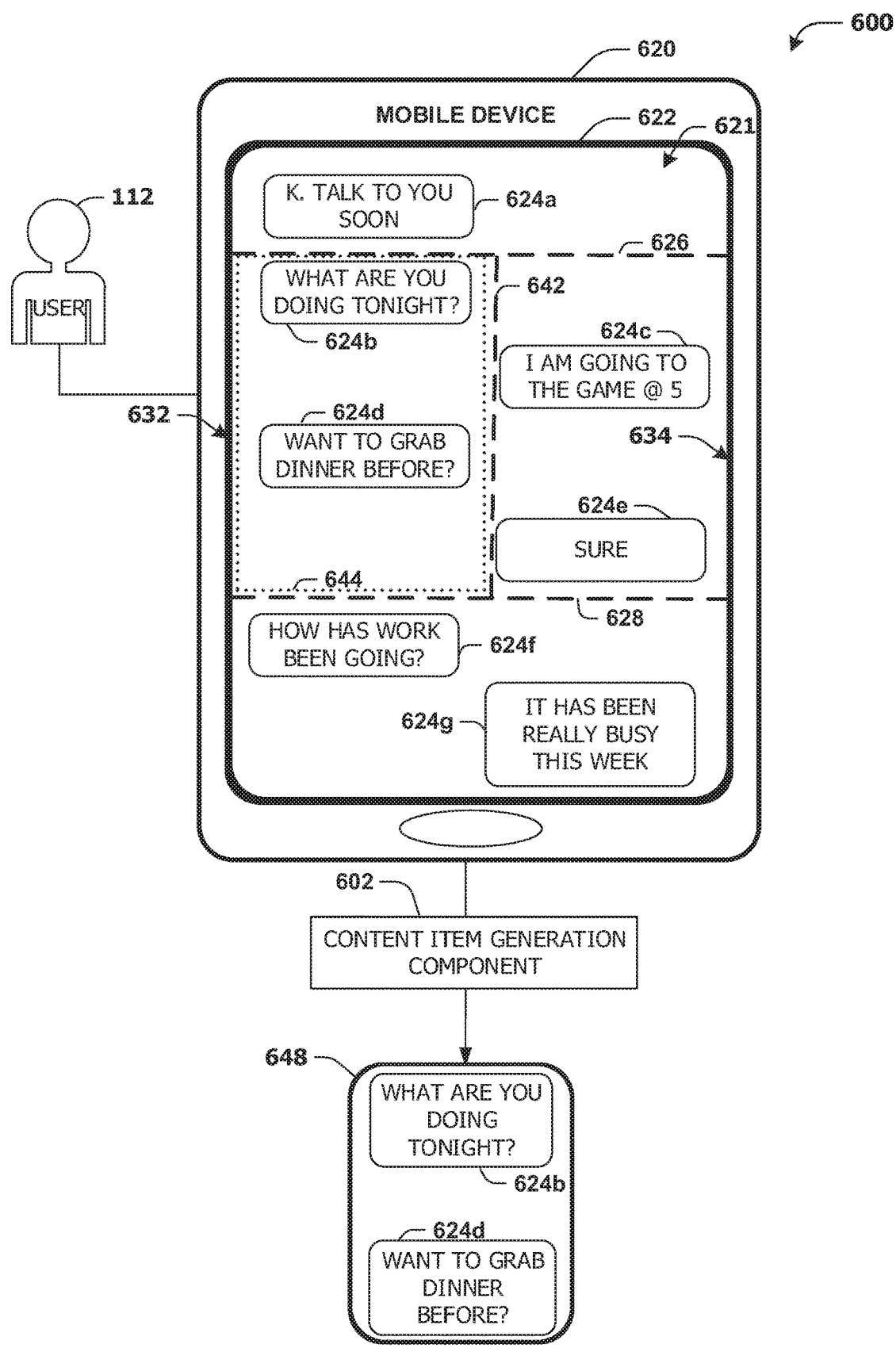
FIG. 6E is a component block diagram illustrating an exemplary system for generating a content item from content within a content area, where a third boundary is formed and a second content area is defined from a first content source.

Referring to FIG. 6E, a third boundary 642 (e.g., a content area segregation boundary) may be defined by the content item generation component 602 in response to a third gesture performed by the user 112 on the display 622. The content item generation component 602 may delineate a second content area 644 (represented by the dotted line) for the text message content source 621 based on the first boundary 626, the second boundary 628, and the third boundary 642. In an example, the third boundary 642 may be used to select a sender's text message content (e.g., text message content 624*b* and text message content 624*d*) but not a receiver's text messages content (e.g., text message content 624*c* and text message content 624*e*) as the second content area 644. The user 112 may perform the third gesture, such as a vertical swipe down the middle of the display 622 followed by a horizontal swipe towards the first side 632 to delineate the second content area 644 (e.g., the horizontal swipe may indicate whether the user 112 wants the content item to include the sender's text message content or the receivers text message content). A second content item 648 may be generated based upon the text message content 624*b* and 624*d* within the second content area 644.

Figure 6F:
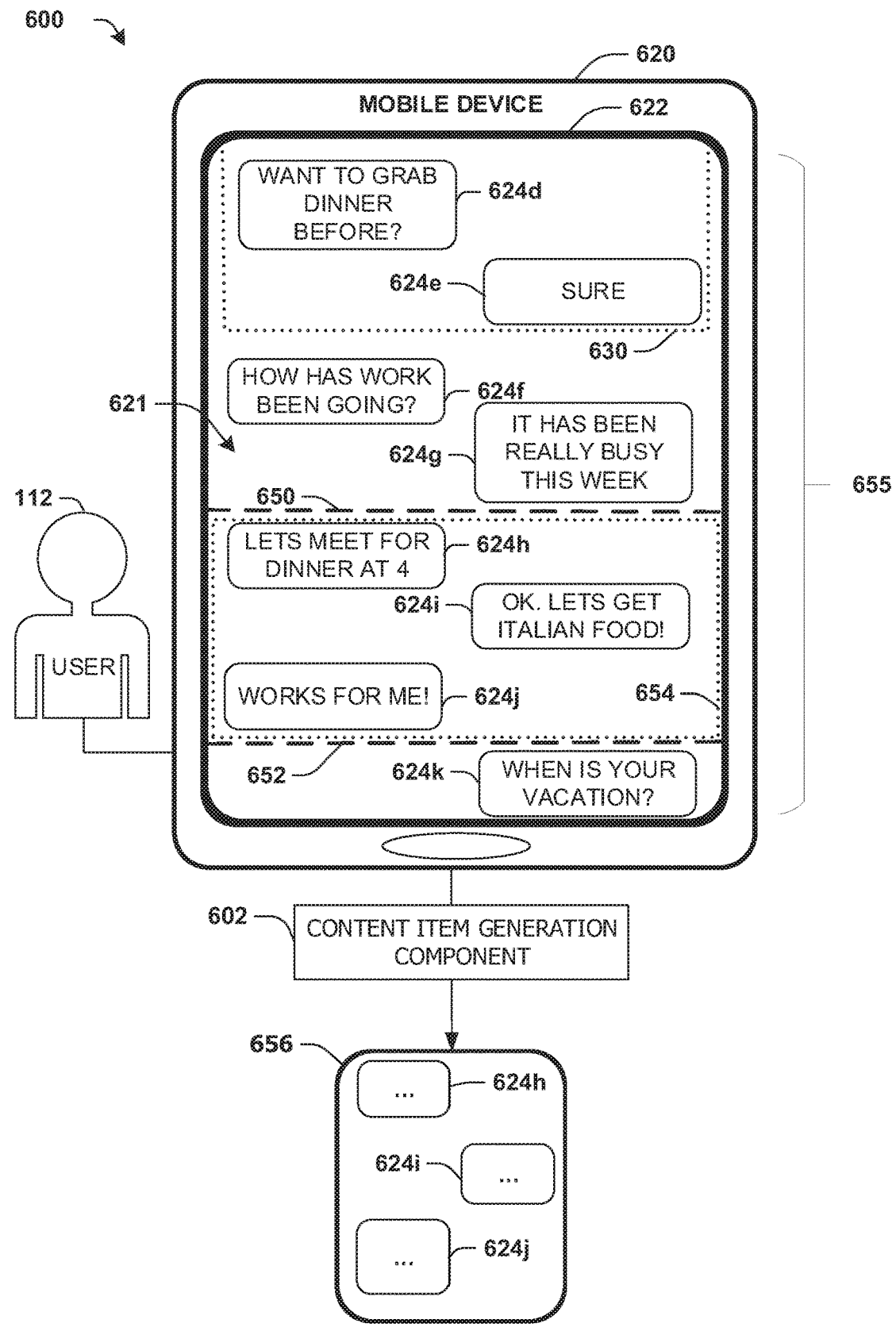
FIG. 6F is a component block diagram illustrating an exemplary system for generating a content item from content within a content area, where a third content area is defined.

Referring to FIG. 6F, a fourth boundary 650 and/or a fifth boundary 652 may be defined for the text message content source 621 in response to a fourth gesture and/or a fifth gesture performed by the user 112 on the display 622. The content item generation component 602 may delineate a third content area 654 based upon the fourth boundary 650 and the fifth boundary 652. The third content area 654 may comprise text message content 624*h*-624*j*. In an example, the first content area 630 and the third content area 654 are spaced apart, such that at least some of the first content area 630 extends beyond a viewable display area 655 of the display 622 (e.g., the user 112 may have to scroll up on the display 622 in order to view the entirety of the first content area 630). The content item generation component 602 may be configured to generate a third content item 656 based upon the text message content 624*h*-624*j* within the third content area 654.

Figure 6G:
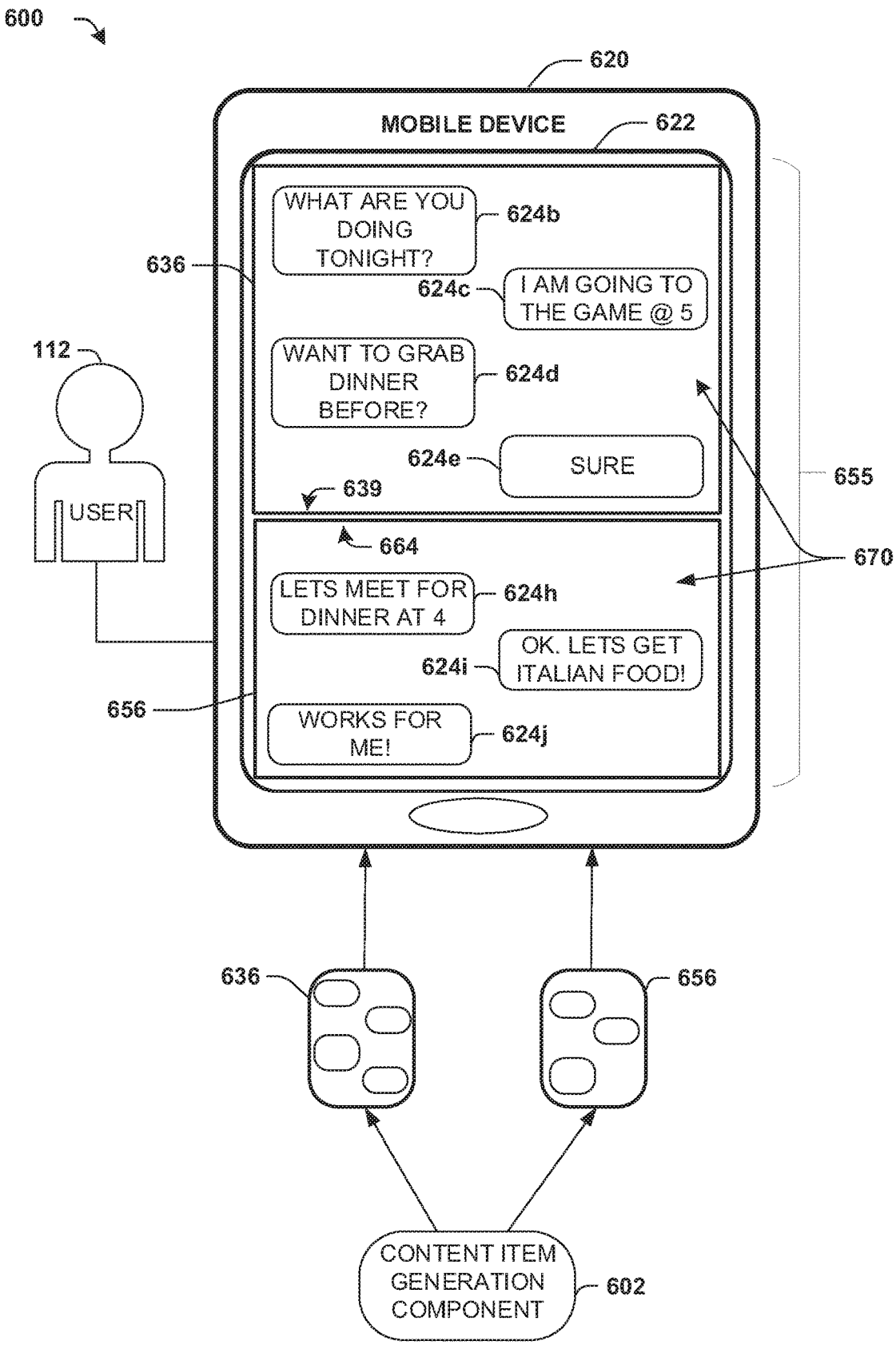
FIG. 6G is a component block diagram illustrating an exemplary system for generating a content item from content within a content area, where a first content item is aligned with a third content item.
Figure 6H:
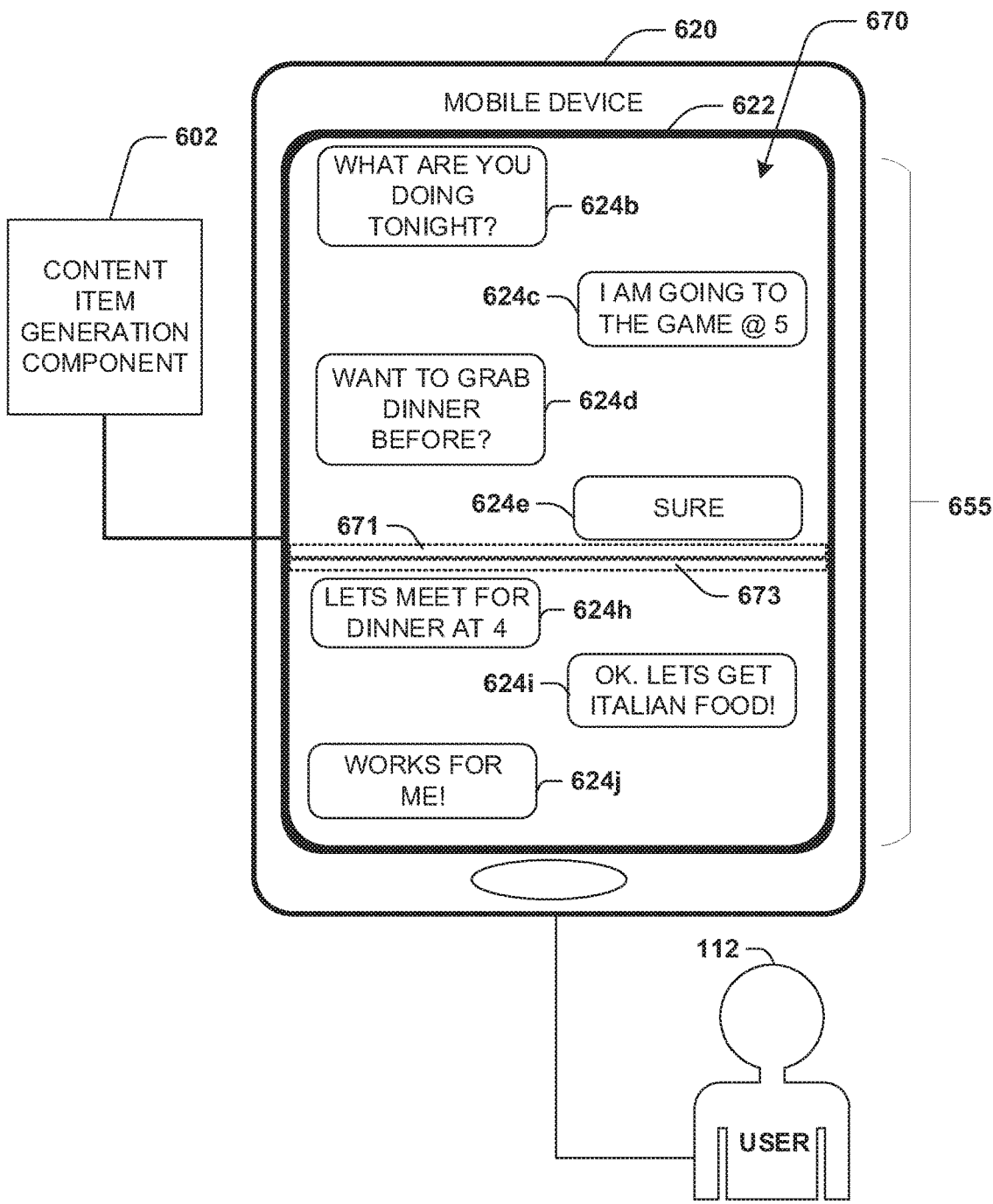
FIG. 6H is a component block diagram illustrating an exemplary system for generating a content item from content within a content area, where a first content item is blended with a third content item to form a first stitched content item.

Referring to FIGS. 6G-6H, the content item generation component 602 may be configured to stitch the first content item 636 to the third content item 656 to generate a first stitched content item 670. The stitching may comprise an aligning and/or a blending the first content item 636 to the third content item 656. Referring to FIG. 6G, the content item generation component 602 may be configured to align the first content item 636 with the third content item 656. In an example, a first content item lower boundary 639 of the first content item 636 may be aligned with a third content item upper boundary 664 of the third content item 656.

Referring to FIG. 6H, the content item generation component 602 may be configured to blend a first portion 671 of the first content item 636 with a second portion 673 of the third content item 656 to generate the first stitched content item 670. In an example, the blending may reduce a transition between the first content item 636 and the third content item 656.

The content item generation component 602 may be configured to scale at least one of the first content item 636, the third content item 656, and/or the first stitched content item 670. In an example, the first content item 636 and the third content item 656 may be scaled to fit within the viewable display area 655. In another example, after the first content items 636 is stitched to the third content item 656 to generate the first stitched content item 670, the first stitched content item 670 may be scaled to fit within the viewable display area 655.

Figure 6I:
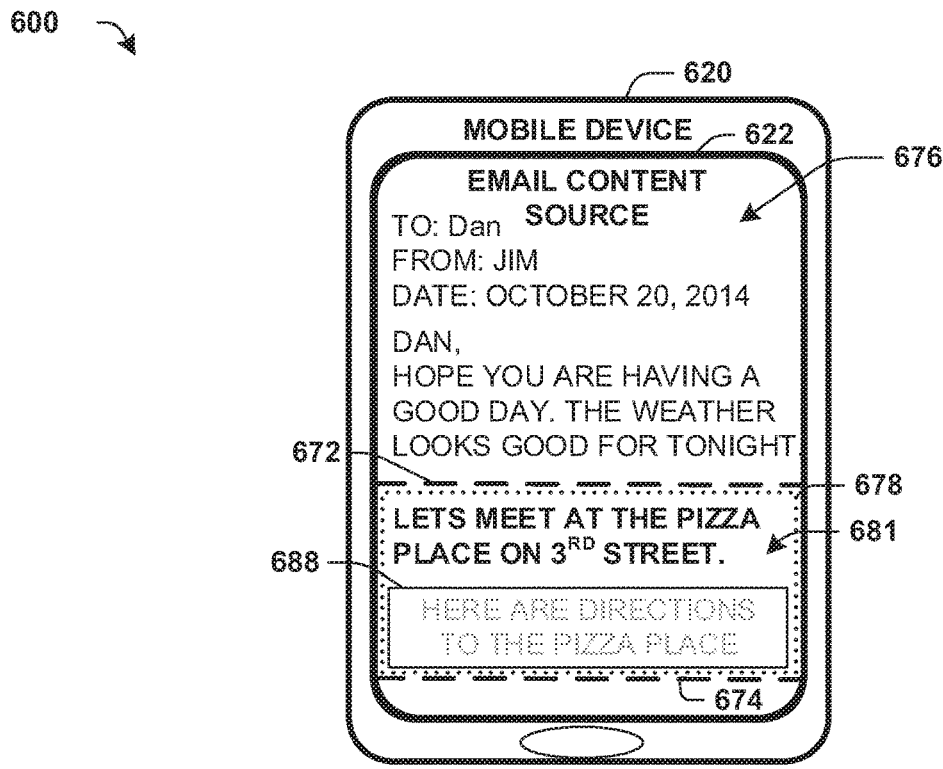
FIG. 6I is a component block diagram illustrating an exemplary system for generating a content item from content within a content area, where a fourth content item is generated from a second content source.
Figure 6J:
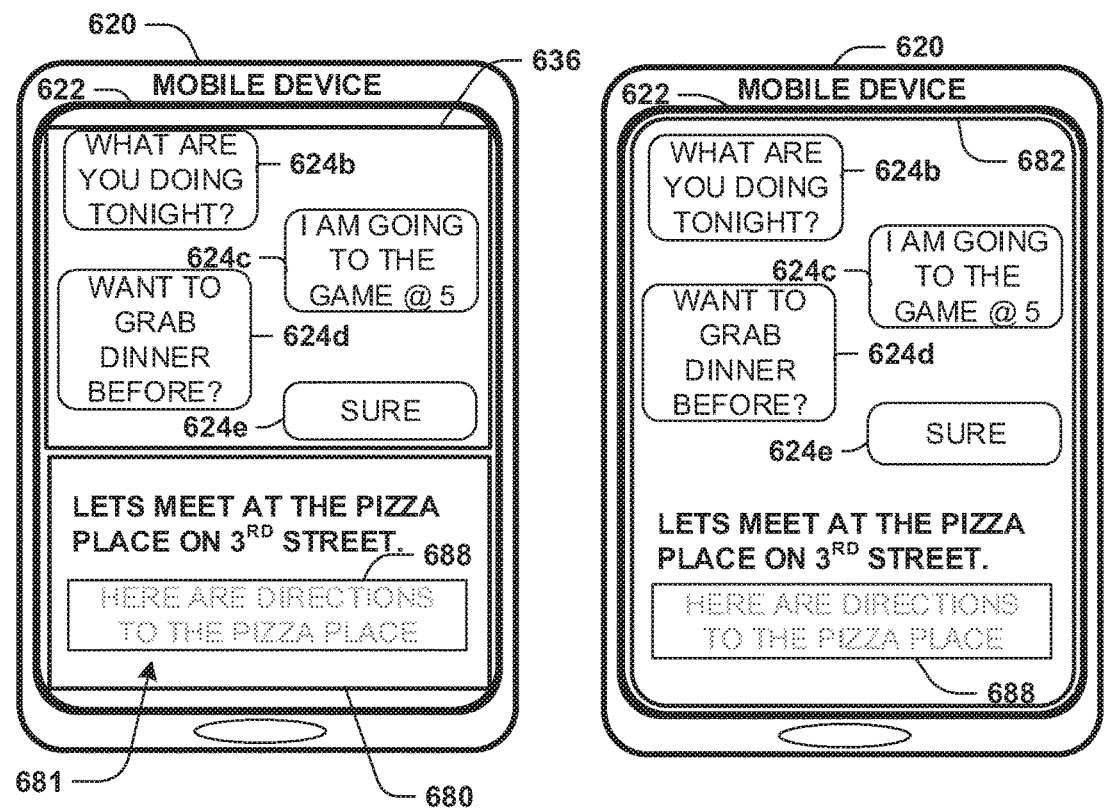
FIG. 6J is a component block diagram illustrating an exemplary system for generating a content item from content within a content area, where a first content item is aligned with a fourth content item.
Figure 6K:
FIG. 6K is a component block diagram illustrating an exemplary system for generating a content item from content within a content area, where a first content item is blended with a fourth content item to form a second stitched content item.

Referring to FIGS. 6I-6K, the content item generation component 602 may be configured to generate a second stitched content item 682 using content from a first content source and content from a second content source. Referring to FIG. 6I, a sixth boundary 672 and/or a seventh boundary 674 may be defined for the email content source 676. The content item generation component 602 may delineate a fourth content area 678 based upon the sixth boundary 672 and the seventh boundary 674. The content item generation component 602 may generate a fourth content item 680 (not illustrated in FIG. 6I) based upon email content 681 within the fourth content area 678. In an example, the email content 681 may comprise hyperlink data 688.

In an example, the first content item 636 from the text message content source 621 may be stitched to a fourth content item 680 from the email content source 676 to form the second stitched content item 682. The stitching may comprise an aligning and/or a blending of the first content item 636 to the fourth content item 680, as illustrated in FIGS. 6J-6K. Referring to FIG. 6K, the hyperlink data 688 may be configured to remain active (e.g., able to be accessed) in the second stitched content item 682. In an example, at least one of the first content item 636, the fourth content item 680, or the second stitched content item 682 may be scaled based upon a display property.

Figure 7:
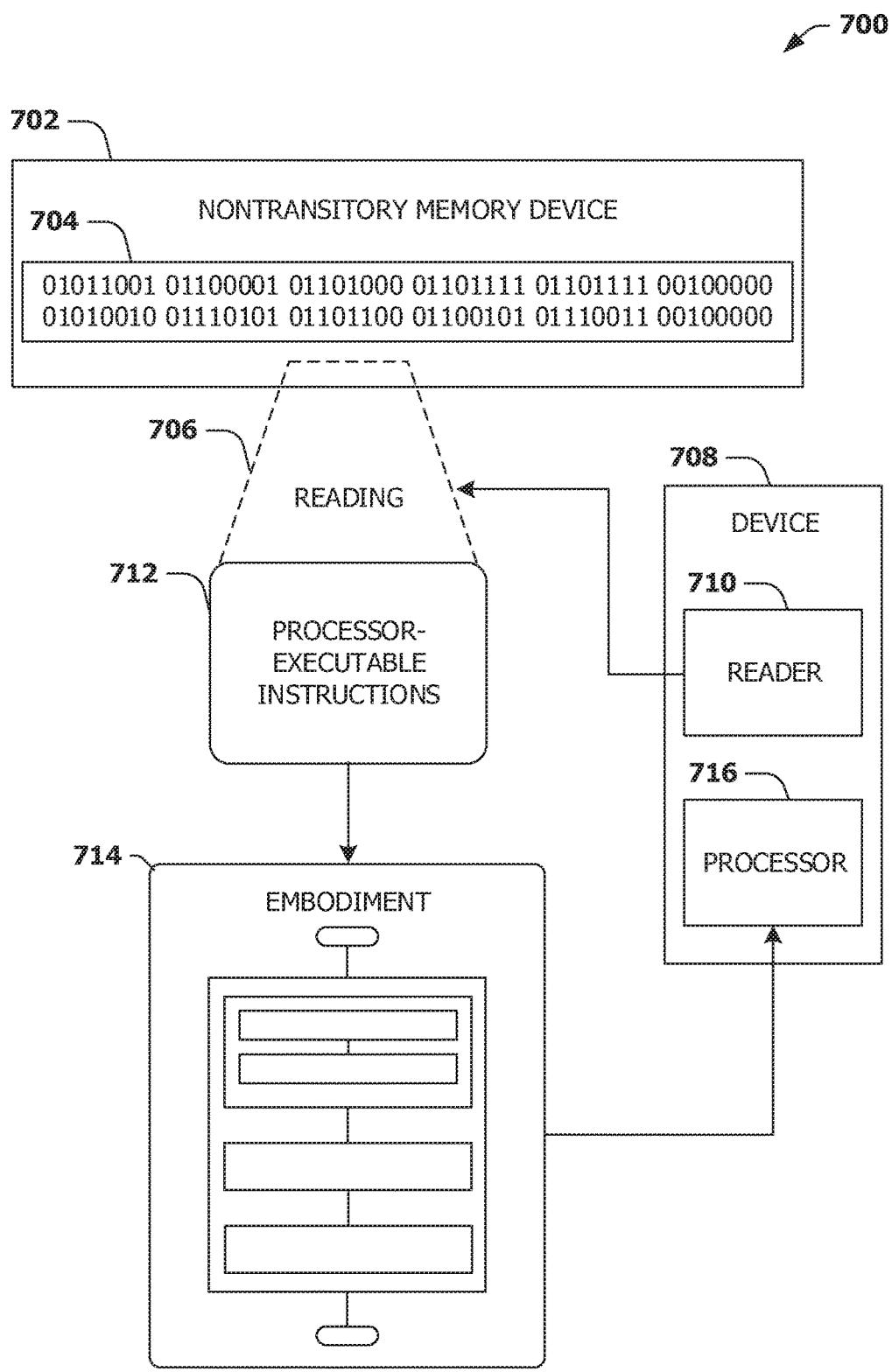
FIG. 7 is an illustration of a scenario featuring an exemplary nontransitory memory device in accordance with one or more of the provisions set forth herein.

FIG. 7 is an illustration of a scenario 700 involving an exemplary nontransitory memory device 702. The nontransitory memory device 702 may comprise instructions that when executed perform at least some of the provisions herein (e.g., embodiment 714). The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The exemplary nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In an example, the processor-executable instructions, when executed on a processor 716 of the device 708, are configured to perform a method, such as at least some of the exemplary method 400 of FIG. 4 and/or method 500 of FIG. 5, for example. In an example, the processor-executable instructions, when executed on the processor 716 of the device 708, are configured to implement a system, such as at least some of system 600 of FIGS. 6A-6K, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller may be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

The invention claimed is:

1. A method, comprising:
    defining a first boundary for a content area based upon a first swipe gesture of a user interface, the user interface displaying first content, second content, third content and fourth content but not fifth content at a first time;
    defining a second boundary for the content area based upon a second swipe gesture of the user interface, the second swipe gesture substantially parallel to the first swipe gesture, the first content comprised in the content area between the first boundary and the second boundary, the fourth content on a different side of the second boundary than the first content;
    defining a third boundary for a second content area based upon a third user input comprising a third swipe gesture substantially parallel to at least one of the first swipe gesture or the second swipe gesture, the first boundary between the third boundary and the second boundary, the second content comprised in the second content area on a first side of the third boundary and between the third boundary and the first boundary, the third content comprised in a third content area on a second side of the third boundary; and
    displaying a stitched content item comprising the first content, the third content and the fifth content, but not the second content and the fourth content, based upon a stitching of the content area comprising the first content to the third content area comprising the third content and the fifth content, wherein the stitched content item is generated based upon a scaling, via upsampling, of at least one of the first content or the third content to fill at least a portion of a display area on which the fourth content was displayed.

2. The method of claim 1, the stitched content item generated by:
generating a first image as a screen capture of at least one of the first content, the third content or the fifth content.

3. The method of claim 2, comprising:
scaling the first image based upon a first display property of a mobile device.

4. The method of claim 2, comprising:
interpolating additional pixels into the first image to improve the quality of the first image.

5. The method of claim 1, wherein the scaling comprises scaling, via upsampling, of the first content to fill at least the portion of the display area on which the fourth content was displayed at the first time.

6. The method of claim 1, wherein the scaling comprises scaling, via upsampling, of the third content to fill at least the portion of the display area on which the fourth content was displayed at the first time.

7. The method of claim 1, comprising:
displaying a share content item user interface element.

8. The method of claim 1, comprising:
displaying a censor content item user interface element.

9. The method of claim 1, comprising:
extracting, for the first content, a first set of display data comprising at least one of source code data for the first content, location data for the first content or hyperlink data for the first content.

10. The method of claim 8, comprising:
responsive to receiving a selection of the censor content item user interface element, censoring a portion of content within the display area.

11. The method of claim 1, the stitching comprising aligning at least one boundary of the content area with at least one boundary of the third content area.

12. The method of claim 1, at least one of the first content, the second content, the third content, the fourth content or the fifth content comprising chat conversation content.

13. The method of claim 1, the first swipe gesture and the second swipe gesture on a mobile device.

14. The method of claim 1, at least one of the first content, the second content, the third content, the fourth content or the fifth content comprising text message content.

15. The method of claim 1, at least one of the first content, the second content, the third content, the fourth content or the fifth content comprising email content.

16. A non-transitory computer readable medium comprising instructions which when executed perform a method, comprising:
defining a beginning boundary for a content area based upon a first swipe gesture of a user interface, the user interface displaying first content, second content, third content and fourth content but not fifth content at a first time;
defining an ending boundary for the content area based upon a second swipe gesture of the user interface, the second swipe gesture substantially parallel to the first swipe gesture, the first content comprised in the content area between the beginning boundary and the ending boundary, the fourth content on a different side of the ending boundary than the first content;
defining a third boundary for a second content area based upon a third user input comprising a third swipe gesture substantially parallel to at least one of the first swipe gesture or the second swipe gesture, the beginning boundary between the third boundary and the ending boundary, the second content comprised in the second content area on a first side of the third boundary and between the third boundary and the beginning boundary, the third content comprised in a third content area on a second side of the third boundary; and
displaying, at a second time after the first time, a stitched content item comprising the first content, the third content and the fifth content that was not displayed at the first time, but not the second content that was displayed at the first time and the fourth content that was displayed at the first time, based upon a stitching of the content area comprising the first content to the third content area comprising the third content and the fifth content, wherein the stitched content item is generated based upon a scaling, via upsampling, of at least one of the first content or the third content to fill at least a portion of a display area on which the fourth content was displayed at the first time.

17. The non-transitory computer readable medium of claim 16, wherein the scaling comprises scaling, via upsampling, of the first content to fill at least the portion of the display area on which the fourth content was displayed at the first time.

18. The non-transitory computer readable medium of claim 16, wherein the scaling comprises scaling, via upsampling, of the third content to fill at least the portion of the display area on which the fourth content was displayed at the first time.

19. A system, comprising:
a processor; and
memory comprising processor-executable instructions that when executed by the processor cause the processor to implement a content item generation component configured to:
define a first boundary for a content area based upon a first swipe gesture of a user interface, the user interface displaying first content, second content, third content and fourth content but not fifth content at a first time;
define a second boundary for the content area based upon a second swipe gesture of the user interface, the second swipe gesture substantially parallel to the first swipe gesture, the first content comprised in the content area between the first boundary and the second boundary, the fourth content on a different side of the second boundary than the first content;
define a third boundary for a second content area based upon a third user input comprising a third swipe gesture substantially parallel to at least one of the first swipe gesture or the second swipe gesture, the first boundary between the third boundary and the second boundary, the second content comprised in the second content area on a first side of the third boundary and between the third boundary and the first boundary, the third content comprised in a third content area on a second side of the third boundary; and
display a stitched content item comprising the first content, the third content and the fifth content, but not the second content and the fourth content, based upon a stitching of the content area comprising the first content to the third content area comprising the third content and the fifth content, wherein the stitched content item is generated based upon a scaling, via upsampling, of at least one of the first content or the third content to fill at least a portion of a display area on which the fourth content was displayed.

20. The system of claim 19, comprising a content interaction component configured to:
   display a save content item user interface element used to save the stitched content item as a file.

\* \* \* \* \*